United States Patent Office 3,755,496
Patented Aug. 28, 1973

3,755,496
COATING COMPOSITIONS
Shun Koizumi, Toyonaka, Takeshi Suzuki, Kyoto, and Chuzo Okuno, Takatsuki, Japan, assignors to Daikin Kogyo Kabushiki Kaisha, Osaka-shi, Japan
No Drawing. Filed July 1, 1971, Ser. No. 159,038
Int. Cl. C08g 45/04
U.S. Cl. 260—836    8 Claims

ABSTRACT OF THE DISCLOSURE

In a pigmented coating composition containing organic liquid medium having dispersed therein a polyvinyl fluoride polymer and pigment, the improvement where in said composition are incorporated an aliphatic polyol having 2 to 15 carbon atoms and 2 to 8 alcoholic hydroxyl groups, an organic antioxidant having a boiling point of higher than the melting point of the vinyl fluoride polymer and 0.5 to 30 weight percent of a glycidyl methacrylate polymer, based on the weight of the vinyl fluoride polymer.

The present invention relates to a coating composition, more particularly to a pigmented coating composition containing vinyl fluoride polymers.

Vinyl fluoride polymers are excellent in hardness, impact resistance, chemical resistance, solvent resistance and weather resistance, and because of such properties they are extensively used in forming durable protective coating on a base material such as steel, aluminum, copper and like metals, concrete, ceramics, etc.

However, since softening point and decomposition temperature of vinyl fluoride polymers are close to each other, these polymers start to decompose in a short period of time when heated to the softening point or to a higher temperature, making it difficult to conduct heat treatment such as baking. For instance, polyvinyl fluoride which has a softening point of 200° C. begins to decompose in 15 to 20 minutes at this temperature, and at 235° C. decomposition takes place in 5 minutes. For this reason, stabilizers such as alkali metal formate, a mixture of aliphatic polyols with zinc bis-(dicyclohexyl dithiophosphynate) and the like have been proposed for use with vinyl fluoride polymers. These stabilizers serve to prevent thermal decomposition of vinyl fluoride polymers to some extent. However, addition of pigment to a coating composition containing vinyl fluoride polymers tends to lower the thermal stability of the polymers, and the stabilizers heretofore known are not fully effective in preventing thermal decomposition of such pigmented vinyl fluoride polymers. For instance, it is essential to bake at 200 to 280° C. a coating resulting from a coating composition of vinyl fluoride polymers in order to form a strong coating firmly adhered to the surface of a base material, but when a coating composition incorporating therein a pigment is used for such application, the coating obtained fails to withstand baking at the above temperature with the inevitable result that thermal deterioration, coloring and embrittlement take place.

An object of this invention is to eliminate the abovementioned drawbacks and to greatly improve heat resistance of pigmented vinyl fluoride polymers.

Another object of this invention is to provide an improved pigmented coating composition of vinyl fluoride polymers which makes it possible to obtain a coating strongly adhered to a base material substantially free from deterioration when the coating is baked at a high temperature of 200 to 280° C.

The present invention coating composition is characterized in that a specific mixture of an aliphatic polyol, organic antioxidant and glycidyl methacrylate polymer is incorporated as a stabilizer in a composition containing a vinyl fluoride polymer and pigment dispersed in an organic medium.

The researches conducted by the present inventors have revealed that when aliphatic polyol, organic antioxidant and glycidyl methacrylate polymer are used in combination as a stabilizer for pigmented vinyl fluoride polymer, these compounds produce a synergistic effect to achieve remarkable improvement in thermal stability of the pigmented vinyl fluoride polymer. In fact, the coating prepared from the present composition is free of thermal deterioration, coloring and substantial impairment of physical properties when baked at a temperature of 200 to 280° C. and serves as a strong coating which is firmly bonded to the base material such as metal. The synergistic effects of the three substances which imparts improved heat resistance to pigmented vinyl fluoride polymers is apparent from the fact that lack of any one of the three components materially mitigates the effect to be otherwise achieved.

The vinyl fluoride polymers to be used in the present invention include, in addition to polyvinyl fluoride, copolymers of vinyl fluoride and copolymerizable monomers containing at least 75 wt. percent of vinyl fluoride. Examples of such copolymerizable monomers are (1) ethylene series hydrocarbons such as ethylene, propylene, isobutylene, styrene, etc.; (2) haloethylene series hydrocarbons such as vinyl chloride, vinyl bromide, vinylidene chloride, vinylidene fluoride, 1,1-difluoro-2-chloroethylene, trifluoroethylene, trifluorochloroethylene, tetrafluoroethylene, 1,1,1 - trifluoropropylene, hexafluoropropylene, etc.; (3) vinyl esters such as vinyl formate, vinyl acetate, vinyl propionate, vinyl butylate, vinyl pivalate, vinyl benzoate, vinyl stearate, vinyl sulfonate, vinyl phosphate, etc.; (4) vinyl ethers such as vinyl ethyl ether, tetrafluoroethyl allyl ether, vinyl dioxolan, etc.; (5) acrylic acid and methacrylic acid, and derivatives thereof such as esters, nitriles, amides, anhydrides, halides, etc.; (6) maleic acid, fumaric acid and derivatives thereof such as dimethyl maleate, dimethyl fumarate, maleic anhydride, etc.; (7) vinyl ketones such as methyl vinyl ketone, etc.; (8) vinyl imides such as N-vinyl phthalimide, N-vinyl succinimide, etc.; (9) propenyl esters such as allyl acetate, isopropenyl acetate, etc.

The abovementioned vinyl fluoride polymer is dissolved or emulsified in an organic liquid medium. The concentration of the polymer used may generally be about 20 to 50 weight percent. As the organic liquid medium, various organic volatile solvents are used, examples thereof being N,N-dimethylacetamide, N,N-diethylformamide, γ-butyrolactone, N-methyl-2-pyrrolidone, dimethyl phthalate, etc. These may be used alone or in combination.

As the pigment to be added to the dispersion of vinyl fluoride polymers, various pigments may be used. Particularly suitable are those having high hiding power such as titanium dioxide, red iron oxide, chrome green, cadmium yellow, cadmium red, carbon black, cyanine blue, cyanine green, etc. Of these pigments titanium dioxide is the most preferable. The amount of the pigment used may vary over a wide range in accordance with the kinds of pigment used. When titanium dioxide is used, for instance, it is preferable to use the pigment in an amount of 5 to 50 weight percent based on vinyl fluoride polymer.

In accordance with this invention it is essential that the pigmented coating composition of vinyl fluoride polymer incorporate therein a specific mixture of the above-mentioned three components, i.e., aliphatic polyol, organic antioxidant and glycidyl polymer. The three components will then act synergically to effect substantial improvement in heat resistance of pigmented polyvinyl fluoride polymer.

Aliphatic polyol, one of the components, are those having 2 to 15 carbon atoms and 2 to 8 alcoholic hydroxyl groups, preferable being those having 3 to 15 carbon atoms and 3 to 8 alcoholic hydroxyl groups. Examples thereof are trimethylol ethane, trimethylol propane, 1,2,3-pentanetriol, 2-methyl - 2,3,4 - butanetriol, 2,4-dimethyl-2,3,4-pentanetriol, pentamethyl glycerin, erythritol, pentaerythritol, dipentaerythritol, tripentaerythritol, arabitol, sorbitol, mannitol, etc. The amount of the aliphatic polyol used may be in a wide range in accordance with the kinds thereof, but it is preferable to use in an amount of 0.01 to 5 weight percent based on the weight of vinyl fluoride polymer. If the amount of the polyol is smaller than 0.01 weight percent, satisfactory improvement in heat resistance of pigmented vinyl fluoride polymer will not be achieved, whereas if it exceeds 5 weight percent, the characteristics of the vinyl fluoride polymer per se are impaired with poor adhesion to the base material.

The organic antioxidant, another component, is generally known as a stabilizer for vinyl polymers. However, it fails to achieve any improvement in heat resistance of vinyl fluoride polymers when used alone for the vinyl fluoride polymers, and it has been found that it is only in combination with the other two components that the organic antioxidant produces effectiveness. Organic antioxidants to be used in this invention are those having a boiling point of higher than the melting point of the vinyl fluoride polymer. The antioxidants used include phenol-based antioxidants, amine-based antioxidants, triazine-based antioxidants, imidazol-based antioxidants, thiodicarboxylic acid esters, and others. Examples of the antioxidants are (1) phenol-based antioxidants: 4,4-dihydroxybisphenyl, dihydroxydiphenylenethane and its derivatives, hydroquinonemonobenzyl ether, 1,1-bis-(4-hydroxyphenyl)cyclohexane,
1-oxy-3-methyl-4-isopropyl benzene,
2,4,5-trihydroxybutyrophenone,
2,4-dimethyl-6-tertiarybutylphenol,
2,6-ditertiarybutylphenol,
2,5-ditertiaryamylhydroquinone,
2,5-ditertiarybutylhydroquinone,
2,6-ditertiarybutyl-p-cresol,
4-hydroxymethyl-2,6-ditertiarybutylphenol,
4,4'-bis-(2,6-ditertiarybutylphenol),
2,6-ditertiarybutyl-α-dimethylamino-p-cresol,
2,2'-methylene-bis-(4-methyl-6-tertiarybutylphenol),
2,2'-methylene-bis-(4-ethyl-6-tertiarybutylphenol),
4,4'-methylene-bis-(6-tertiarybutyl-o-cresol),
4,4'-methylene-bis-(2,6-ditertiarybutylphenol),
6-tertiarybutylmethylphenol derivatives,
1,3,5-trimethyl-2,4,6-tris-(3,5-ditertiarybutyl-4-hydroxybenzene),
4,4'-butylidene-bis-(3-methyl-6-tertiarybutylphenol),
4,4'-thio-bis-(6-tertiarybutyl-3-methylphenol),
bis-(3-methyl-4-hydroxy-5-tertiarybutylbenzylsulfide),
4,4'-thio-bis-(6-tertiarybutyl-o-cresol)-2,2'-thio-bis-(4-methyl-6-tertiarybutylphenol),
thio-bis-(disecondaryamylphenol),
2,2'-dihydroxy-3,3'-di-(α-methylcyclohexyl)-5,5'-dimethyldiphenylmethane, styrenated phenol, dialkylphenolsulfide, hindered phenols, high molecular weight phenol compounds, etc., (2) amine-based antioxidants:

phenyl-α-naphthylamine,
phenyl-β-naphthylamine,
N,N'-diphenyl-p-phenylenediamine,
N,N'-di-β-naphthyl-p-phenylenediamine,
N,N'-diallyl-p-phenylenediamine,
N-isopropyl-N'-phenyl-p-phenylenediamine,
2,2,4-trimethyl-1,2-dihydroquinoline polymers,
6-ethoxy-2,2,4-trimethyl-1,2-dihydroquinoline, condensation product of diphenyl amine and acetone, condensation product of phenyl-β-naphthylamine and acetene, aldol-α-naphthylamine, etc., (3) triazine-based antioxidants: triazine derivatives, e.g., 2,4-bis-(n-octylthio)-6-(4-hydroxy-3,5-di-t-butyl-anilino)-1,3,5-triazine,
4-n-octylthio-2,6-bis-(4-hydroxy-3,5-di-t-butyl-anilino)-1,3,5-triazine, etc., (4) imidazole-based antioxidants: 2-mercaptobenzoimidazole, zinc salt of 2-mercaptobenzoimidazole, etc., (5) thiodicarboxylic acid esters having the formula of $$S(C_nH_{2n}COOR)_2$$

wherein R is alkyl or alkenyl of 6 to 20 carbon atoms and $n$ is an integer of 1 to 4; distearyl thiodipropionate, dilauryl thiodipropionate, etc., (6) others: reaction product of morpholinium-N-oxy-di-ethylene-dithiocarbamate and dibenzothiazyl disulfide, reaction product of 1,1-bis-(4-hydroxyphenyl)-cyclohexane and organic amines, tri-(nonylphenyl)-phosphite, hydrazine derivatives, mixtures of aromatic hydrazines and hydroquinone derivatives, etc.

The organic antioxidant such as above is preferably used in an amount of 0.01 to 5 weight percent based on the weight of vinyl fluoride polymer. If the amount is smaller than 0.01 weight percent, the antioxidant fails to impart substantially improved heat resistance to the polyvinyl fluoride polymer, while if in excess of 5 weight percent, it impairs the characteristics of the vinyl fluoride polymer per se.

Glycidyl methacrylate polymer, another component, is a homopolymer of glycidyl methacrylate or a copolymer of glycidyl methacrylate and some other vinyl monomer. The copolymers are those containing at least 50 weight percent, preferably more than 70 weight percent, of glycidyl methacrylate. Of these preferable is a homopolymer of glycidyl methacrylate. The vinyl monomer to be copolymerized with glycidyl methacrylate includes methyl acrylate, methyl methacrylate, ethyl acrylate, ethyl methacrylate, butyl methacrylate, vinyl acetate, styrene, ethylene, vinyl chloride, vinyl propionate, etc. Of these vinyl monomers acryl esters or methacryl esters are preferable. If the polymerization degree of such glycidyl methacrylate polymers is exceedingly high, they exhibit a low solubility in an organic liquid medium. It is therefore preferable to use polymers having an intrinsic viscosity of about 0.25 to 2.0 (dl./g.) at 35° C. when dissolved in methyl ethyl ketone.

The glycidyl polymer is used in an amount of 0.5 to 30 weight percent based on the weight of vinyl fluoride polymer. Use of the glycidyl polymer in an amount of less than 0.5 weight percent results in low effect of improving heat resistance of vinyl fluoride polymer, while the glycidyl polymer when used in an amount of more than 30 weight percent will impair the characteristics of the vinyl fluoride polymer per se and results in poor adhesion to the base material. The preferable amount is in the range of 1 to 20 weight percent. The present coating composition may be used in conventional manner. For example, a base material is coated with the composition by dipping, spraying, coating etc., and baked at 200 to 280° C. after being dried, whereby coating strongly adhered to the base material can be obtained substantially free of deterioration in properties of the coating film.

Examples of the method of synthesizing glycidyl methacrylate are given below as reference examples along with examples of this invention for a better understanding thereof, in which all parts are by weight.

REFERENCE EXAMPLE 1

Into a wide-mouthed glass bottle with an intermediate closure made of polyethylene were placed 30 g. of glycidyl methacrylate and 0.5 g. of diisopropyl peroxydicarbonate of the formula

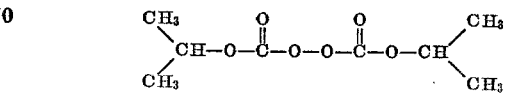

and the mixture was heated at 40 to 60° C. for polymerization. Increase in viscosity indicated progress of the polymerization. The temperature was then lowered to room temperature and polymerization was allowed to proceed while the reaction system was shaken occasionally. When the system turned honey-like, it was diluted with acetone and the diluted mixture was added dropwise to a great amount of water for precipitation. After being washed thoroughly with water, the precipitate was dried at about 40° C. under a reduced pressure to obtain a white polymer. The polymer was soluble in methyl ethyl ketone and had intrinsic viscosity [η] of 0.47 (dl./g.) at 35° C.

REFERENCE EXAMPLE 2

Into a wide-mouthed glass bottle with an intermediate polyethylene closure were placed 21 g. of glycidyl methacrylate, 9 g. to vinyl acetate and 0.5 g. of diisopropyl peroxydicarbonate, and the mixture was subjected to polymerization in the same manner as in Reference Example 1 to obtain a white polymer. The intrinsic viscosity [η] of the polymer as determined at 35° C. by using a methyl ethyl ketone solution of the polymer was 0.33 (dl./g.).

Vinyl propionate and methyl methacrylate were respectively used instead of vinyl acetate to prepare glycidyl methacrylate copolymers by polymerization carried out in the same manner as above. The intrinsic viscosities of these copolymers as determined at 35° C. by using methyl ethyl ketone solutions thereof were 0.27 (dl./g.) and 0.29 (dl./g.).

Example 1

Into 100-cc., wide-mouthed glass bottle with a closure were placed 20 parts of polyvinyl fluoride powder having intrinsic viscosity [η] of 0.93 (dl./g.) as measured at 100° C. by using γ-butyrolactone solution thereof and average particle size of 0.36μ, 8 parts of titanium dioxide, 0.2 part of tripentaerythritol, 0.2 part of 4,4'-butylidene-bis-(6-tertiary-butyl-3-cresol) and 0.5 part of an N,N-dimethylacetamide solution containing 40 wt. percent of polyglycidyl methacrylate prepared in Reference Example 1. These ingredients were further mixed together for an hour in a paint mill to prepare a uniform pigmented polyvinyl fluoride composition. The resulting composition was applied by a knife coater to a 0.5-mm. thick aluminum plate surface treated with "Bonderite 721" (Trademark, Nihon Parkerizing Co. Ltd., Japan) and to a 0.5-mm. thick steel plate surface treated with "Bonderite 144" (Trademark, Nihon Parkerizing Co. Ltd., Japan) respectively, and the plates were then baked at 250° C. for 5, 10 or 15 minutes in an air oven.

Other samples were further prepared in the same manner as above except that 2.5, 5.0 and 10.0 parts of a 40 weight percent N,N-dimethylacetamide solution of the polyglycidyl methacrylate the same as above were used respectively.

The color of each of the samples was inspected with the unaided eyes and the adhesion ability of the coating to the base material was determined by reverse impact test. The test was conducted in the following manner. Eleven cut lines spaced apart by 1 mm. were formed by a knife through the coating to the base material in vertical and horizontal directions respectively to form 100 squares. The sample was then pressed outward 6 mm. from the opposite side of the coating and "Cellotape" (Trademark, an adhesive cellophane tape of Nichiban Co. Ltd., Japan) was pressed on the coating and was then forcibly peeled off the base material. The number of the squares left intact on the base material was counted. The adhesion is expressed by a fraction having the above counted number as numerator and the total number of the squares as denominator. The results are given in Table 1.

TABLE 1

| Base material | Proportion of polyglycidyl methacrylate (part) | Colored degree 250° C. 10 min. | Colored degree 250° C. 15 min. | Adhesiveness 250° C. 10 min. | Adhesiveness 250° C. 15 min. |
|---|---|---|---|---|---|
| Al plate | 1 | pure white | pure white | 100/100 | 100/100 |
|  | 5 | do | do | 97/100 | 100/100 |
|  | 10 | do | do | 34/100 | 90/100 |
|  | 20 | do | do | 27/100 | 62/1000 |
| Steel plate | 1 | do | do | 100/100 | 100/100 |
|  | 5 | do | do | 63/100 | 100/100 |
|  | 10 | do | do | 17/100 | 100/100 |
|  | 20 | do | do | 11/100 | 93/100 |

Note: The proportion of polyglycidyl methacrylate is a ratio thereof per 100 parts of polyvinyl fluoride, the same as in herein below.

As apparent from Table 1, use of aliphatic polyol, antioxidant and glycidyl methacrylate polymer produces a synergic effect of the three components to result in remarkable effect to prevent coloring, making it possible to obtain a pure white coating exhibiting excellent adhesion property.

COMPARISON EXAMPLE 1

Into a 100-ml. wide-mouthed glass bottle equipped with a closure were placed 20 parts of polyvinyl fluoride powder the same as used in Example 1, 8 parts of titanium dioxide, 70 parts of a solvent mixture of dimethyl phthalate and diisobutylketone in a weight ratio of 1:1, and 0.5 part of an N,N-dimethylacetamide solution containing 40 wt. percent of homopolymer of glycidyl methacrylate described in Reference Example 1. These ingredients were mixed together for an hour in a paint mill to obtain a polyvinyl fluoride composition.

The resulting composition was applied by a knife coater to a 0.5-mm. thick aluminum plate surface-treated with "Bonderite 721" (Trademark, the same as in Example 1) and to 0.5-mm. thick steel plate surface-treated with "Bonderite 144" (Trademark, the same as in Example 1) respectively, and the plates were then baked at 250° C. for 5 or 10 minutes in an air oven.

Samples were further prepared in the same manner as above except that 2.5, 5.0 and 10.0 parts of N,N-dimethylacetamide solution of the glycidyl methacrylate homopolymer the same as above were used respectively.

The coatings obtained were tested in the same manner as in Example 1 to give the results in Table 2.

TABLE 2

| Base material | Proportion of polyglycidyl methacrylate | Colored degree 250° C. 5 min. | Colored degree 250° C. 10 min. |
|---|---|---|---|
| Steel plate | 1 | Brown | Dark brown. |
|  | 5 | do | Do. |
|  | 10 | do | Do. |
|  | 20 | do | Do. |
| Al plate | 1 | do | Brown. |
|  | 5 | do | Do. |
|  | 10 | do | Do. |
|  | 20 | do | Do. |

It will be apparent from Table 2 that the polyglycidyl methacrylate, when used alone, failed to prevent coloring.

Comparison Example 2

In the same manner as in Comparison Example 1, a polyvinyl fluoride composition was prepared from a mixture of 20 g. of polyvinyl fluoride powder the same as Example 1, 8 g. of titanium dioxide, 70 g. of a solvent mixture of dimethyl phthalate and diisobutyl ketone in a weight ratio of 1:1, 0.2 g. of tripentaerythritol and 0.2 g. of 4,4'-butylidene-bis-(6-tertiary-butyl-3-cresol). In the same manner as in Example 1, the composition was applied to base materials, baked and the coating obtained was inspected to determine coloring. The results are listed in Table 3.

TABLE 3

| | Al plate | | Steel plate | |
| --- | --- | --- | --- | --- |
| | 250° C. 5 min. | 250° C. 10 min. | 250° C. 5 min. | 250° C. 10 min. |
| Colored state | Slightly yellowish. | Yellow | Slightly yellowish. | Light yellow. |

As will be apparent from Table 3, the combination of aliphatic polyol and antioxidant, two of the three components of this invention prevented coloring to some extent, but the composition was not well fit for practical use in view of the color.

Example 2

In the same manner as in Example 1, 20 parts of polyvinyl fluoride powder the same as in Example 1, 8 parts of titanium dioxide, 2.5 parts of an N,N-dimethylacetamide solution containing 40 weight percent of polyglycidyl methacrylate, 0.2 part of tripentaerythritol and 70 parts of a solvent mixture of dimethyl phthalate and diisobutyl ketone in a weight ratio of 1:1 were mixed together and to the resulting mixture was added 0.2 part of one of the following antioxidants: 1,3,5-trimethyl-2,4,6-tris (3,5-di-tertiarybutyl-4-hydroxybenzyl) benzene, high molecular weight hindered polyphenol ("Irganox 1010," product of Geigy Chemical Crop., Switzerland), low temperature reaction product of diphenylamine and acetate ("Antigen AM," product of Sumitomo Chemical Co., Ltd., Japan), 2-mercaptobenzimidazole and 4-n-octylthio-2,6-bis-(4-hydroxy-3,5-di-t-butyl - aniline) - 1,3,5 - triazine, whereby 5 kinds of uniform polyvinyl fluoride compositions were obtained.

Each of the compositions was applied to an untreated aluminum plate by a knife coater and the coated plate was then baked at 250° C. for 15 minutes in an air oven.

The resulting coating had a thickness of about 20 to 25µ and reverse impact test on each sample gave a result of 100/100. The coatings were white in the case of "Antigen AM" and light yellowish white with 2-mercaptobenzimidazole, the others being pure white.

Example 3

In the same manner as in Example 1, 20 parts of powder of vinyl fluoride-vinylidine fluoride copolymer containing 95 mol percent of vinyl fluoride and having a melting point of 192° C. and an average particle size of 0.37µ, 8 parts of titanium dioxide, 2.5 parts of an N,N-dimethylacetamide solution containing 40 weight percent of glycidyl methacrylate-vinyl acetate copolymer in Reference Example 2, 0.2 part of dipentaerythritol, 0.2 part of 4,4'-butaylidene-bis (6-tertiary-butyl-3-cresol) and 70 parts of a solvent mixture of dimethyl phthalate and diisobutyl ketone in a weight ratio of 1:1 were mixed together to obtain a uniform composition of vinyl fluoride copolymer.

In the same manner as in Example 1, this composition was applied to an aluminum plate surface-treated with "Bonderite 721" (Trademark, the same as in Example 1) and the coated plate was baked at 250° C. for 15 minutes. The coating thus prepared was pure white and, when subjected to reverse impact test described in Example 1, gave a result of 100/100, showing excellent adhesion.

Example 4

In the same manner as in Example 1, 20 parts of powder of vinyl fluoride-trifluorochloroethylene copolymer (containing 89 mol percent of vinyl fluoride and having a melting point of 156° C.), 8 parts of titanium dioxide, 2.5 parts of an N,N-dimethylacetamide solution containing 40 weight percent of glycidyl methacrylate-vinyl propionate copolymer in Reference Example 2, 0.2 part of pentaerythritol, 0.2 part of high molecular weight polyphenol ("Irganox 1010," the same as in Example 2) and 70 parts of a solvent mixture of dimethyl phthalate and diisobutyl ketone in a weight ratio of 3:2 were mixed together to obtain a uniform composition of vinyl fluoride copolymer.

In the same manner as in Example 1, the composition was applied to an aluminum plate surface treated with "Bonderite 721" (Trademark, the same as in Example 1) and the coated plate was baked at 250° C. for 15 minutes. The coating thus prepared was pure white and reverse impact test thereon gave a result of 100/100, this indicating excellent adhesion.

Example 5

In the same as in Example 3, 20 parts of powder of vinyl fluoride-trifluoroethylene copolymer (containing 75 mol percent of vinyl fluoride and having melting point of 193° C.), 8 parts of titanium dioxide, 2.5 parts of an N,N-dimethylacetamide solution containing 40 weight percent of glycidyl methacrylate-methyl methacrylate copolymer described in Reference Example 2, a predetermined amount of dipentaerythritol, a predetermined amount of 1,3,5-trimethyl-2,4,6-tris (3,5-di-tertiary-butyl-4-hydroxybenzyl) benzene and 70 parts of a solvent mixture of dimethyl phthalate and diisobutyl ketone in a ratio of 1:1 were mixed together for an hour in a paint mill to prepare a uniform composition of vinyl fluoride copolymer.

In the same manner as in Example 1, the composition was applied to an aluminum plate surface-treated with "Bonderite 721" (Trademark, the same as in Example 1) and the coated plate was then baked at 250° C. for 15 minutes. The resulting coating was tested in the same manner as in Example 1. The results are shown in Table 4.

TABLE 4

| Dipentaerythritol | 1,3,5-trimethyl-2,4,6-tris (3,5-ditertiarybutyl-d-hydroxy-benzyl)benzene (part) | Colored degree | Adhesiveness |
| --- | --- | --- | --- |
| 0.01 | 1.0 | Light yellow | 100/100 |
| 0.25 | 1.0 | Pure white | 100/100 |
| 1.0 | 1.0 | do | 100/100 |
| 5.0 | 1.0 | do | 83/100 |
| 1.0 | 0.01 | Light yellow | 100/100 |
| 1.0 | 0.25 | Pure white | 100/100 |
| 1.0 | 5.0 | do | 79/100 |
| 0 | 0 | Brown | 0/100 |

Note: "Part" in Table 5 shows weight part based on 100 weight parts of vinyl fluoride-trifluoroethyelne copolymer.

Example 6

In the same manner as in Example 3, 20 parts of polyvinyl fluoride powder (the same as in Example 1), 1.5 parts of an N,N-dimethylacetamide solution containing 40 weight percent of polyglycidyl methacrylate, 0.2 part of pentaerythritol, 0.2 part of high molecular weight hindered polyphenol ("Irganox 1010," the same as in Example 2) and 35 parts of a solvent mixture of dimethyl phthalate and diisobutyl ketone in a weight ratio of 1:1 were mixed together to obtain a uniform composition of vinyl fluoride polymer.

The composition was applied to an untreated aluminum plate and the coated plate was baked at 250° C. for 15 minutes in the same manner as in Example 1. The coating obtained exhibited slightly white turbidity but no yellowing due to thermal decomposition of polyvinyl fluoride. Reverse impact test thereon gave a result of 100/100, this showing excellent adhesion.

Example 7

In the same manner as in Example 1, 20 parts of a vinyl fluoride polymer shown in Table 5 below, 8 parts of titanium dioxide, 0.2 part of an aliphatic polyol shown in Table 5, 0.2 part of an antioxidant agent shown in Table 5 and 2.5 parts of N,N-dimethyl acetamide solution containing 40% of glycidyl methacrylate polymer shown in Table 5 were together mixed for one hour in a paint mill to produce uniform coating composition.

The composition was applied to an aluminum plate treated with "Bonderite 721" (Trademark, the same as in Example 1) and the coated plate was baked at 250° C. for 15 minutes. The colored degree of the resultant coating was inspected. The results are shown in Table 5 below, in which colored degree determined by the following criteria.

(1) Not discolored
(2) Slightly discolored
(3) Light brown or light yellowish brown
(4) Brown
(5) Brown to black mer, based on the weight of the vinyl fluoride polymer, said glycidyl methacrylate polymer containing at least 50 weight percent glycidyl methacrylate.

2. The coating composition according to claim 1, in which said aliphatic polyol has 3 to 15 carbon atoms and 3 to 8 alcoholic hydroxyl groups.

3. The coating composition according to claim 1, in which said aliphatic polyol is contained in an amount of 0.01 to 5 weight percent, based on the weight of the vinyl fluoride-polymer.

4. The coating composition according to claim 1, in which said organic antioxidant is contained in an amount of 0.01 to 5 weight percent, based on the weight of the vinyl fluoride polymer.

TABLE 5

| No. | Antioxidant | Polyol | GM polymer | Colored degree | |
|---|---|---|---|---|---|
| | | | | PVF | P(VF–VdF) |
| 1 | 1,1-bis-(4-hydroxyphenyl)-cyclohexane | Pentaerythritol | GM–MMA cop. | 1 | 1 |
| 2 | do | No use | GM–MMA cop. | 3 | 3 |
| 3 | No use | Pentaerythritol | GM–MMA cop. | 3 | 3 |
| 4 | 2,4-dimethyl-6-tertiarybutylphenol | Trimethylolethane | GM–EA cop. | 2 | 2 |
| 5 | 2,6-ditertiarybutyl-p-cresol | 1,2,3-pentanetriol | PGM | 2 | 1 |
| 6 | 2,2'-methylene-bis-(4-methyl-6-tertiarybutylphenol) | Dipentaerythritol | PGM | 1 | 1 |
| 7 | Styrenated phenol | Mannitol | GM–VA cop. | 2 | 2 |
| 8 | Phenol-α-naphthylamine | Tripentaerythritol | PGM | 2 | 1 |
| 9 | do | No use | PGM | 4 | 4 |
| 10 | No use | Tripentaerythritol | PGM | 4 | 4 |
| 11 | Phenyl-β-naphthylamine | do | PGM | 2 | 2 |
| 12 | N,N'-diphenyl-p-phenylendiamine | do | GM–EA cop. | 1 | 1 |
| 13 | N,N'-diallyl-p-phenylendiamine | Pentaerythritol | GM–EA cop. | 2 | 1 |
| 14 | N-isopropyl-N'-phenyl-p-phenylendiamine | do | GM–EA cop. | 2 | 2 |
| 15 | 6-ethoxy-2,2,4-trimethyl-1,2-dihydroquinoline | Trimethylolpropane | GM–MMA cop. | 2 | 2 |
| 16 | Condensation product of phenyl-β-naphthylamine and acetone | do | GM–MMA cop. | 2 | 2 |
| 17 | 2,4-bis-(n-octylthio)-6-(4-hydroxy-3,5-di-t-butyl-anilino)-1,3,5-triazine | Pentaerythritol | GM–MMA cop. | 1 | 1 |
| 18 | do | No use | GM–MMA cop. | 3 | 3 |
| 19 | No use | Pentaerythritol | GM–MMA cop. | 3 | 3 |
| 20 | 4-n-octylthio-2,6-bis-(4-hydroxy-3,5-di-t-butyl-anilino)-1,3,5-triazine | Dipentaerythritol | GM–VP cop. | 1 | 1 |
| 21 | Zinc salt of 2-mercaptobenzoimidazole | do | PGM | 1 | 1 |
| 22 | Distearylthiodipropionate | do | PGM | 1 | 1 |
| 23 | Dilaurylthiodipropionate | do | PGM | 2 | 2 |
| 24 | Reaction product of morpholinium-N-oxy-di-ethylene-dithiocarbamate and dibenzothiazyldisulfide | do | PGM | 1 | 1 |
| 25 | Reaction product of 1,1-bis-(4-hydroxyphenol)-cyclohexane and organic amines | do | PGM | 1 | 1 |
| 26 | Tri-(nonylphenyl)-phosphite | do | PGM | 2 | 2 |

Note:
(1) PVF: Polyvinyl fluoride the same as used in Example 1.
(2) P(VF–VdF): Vinyl fluoride-vinylidene fluoride copolymer the same as used in Example 3.
(3) GM: Glycidyl methacrylate.
(4) GM–MMA cop.: Glycidyl methacrylate-methyl methacrylate copolyer obtained in Reference Example 2.
(5) GM–EA cop.: Glycidyl methacrylate-ethyl acrylate copolymer obtained by copolymerizing glycidyl methacrylate and ethyl acrylate in the same manner as in Reference Example 2, the copolymer having an intrinsic viscosity of 0.31 (dl./g.) at 35° C.
(6) PGM: Polyglycidyl methacrylate obtained in Reference Example 1.
(7) GM–VA cop.: Glycidyl methacrylate-vinyl acetate copolymer obtained in Reference Example 2.
(8) GM–VP cop.: Glycidyl methacrylate-vinyl propionate copolymer obtained in Reference Example 2.

What we claim is:

1. In a pigmented coating composition containing organic liquid medium having dispersed therein a vinyl fluoride polymer containing at least 75 weight percent vinyl fluoride and pigment, the improvement where in said composition are incorporated an aliphatic polyol having 2 to 15 carbon atoms and 2 to 8 alcoholic hydroxyl groups, an organic antioxidant having a boiling point of higher than the melting point of the vinyl fluoride polymer and 0.5 to 30 weight percent of a glycidyl methacrylate poly- 5. The coating composition according to claim 1, in which said glycidyl methacrylate polymer has an intrinsic viscosity of 0.25 to 2.0 (dl./g.) at 35° C.

6. The coating composition according to claim 1, in which said glycidyl methacrylate polymer is polyglycidyl methacrylate or a copolymer of at least 50 wt. percent of glycidyl methacrylate and other vinyl monomer.

7. The coating composition according to claim 6, in which said glycidyl methacrylate polymer is polyglycidyl methacrylate.

8. The coating composition according to claim 1, in which said glycidyl methacrylate polymer is contained in an amount of 1 to 20 weight percent, based on the weight of the vinyl fluoride polymer.

References Cited

UNITED STATES PATENTS

| 3,301,919 | 1/1967 | Cenci | 260—836 |
| 3,423,481 | 1/1969 | Mizutani | 260—836 |
| 3,562,354 | 2/1971 | Golstein | 260—836 |

FOREIGN PATENTS

| 2,022,279 | 11/1970 | Germany | 260—836 |

PAUL LIEBERMAN, Primary Examiner

U.S. Cl. X.R.

260—37 Ep, 41 B, 45.8 SN, 45.8 N, 45.85, 45.9 R, 45.95